United States Patent [19]

Sterner et al.

[11] Patent Number: 4,871,567
[45] Date of Patent: Oct. 3, 1989

[54] METHOD FOR PREPARING RECONSTITUTABLE REFRIED BEANS CONTAINING CRUSHED AND WHOLE BEANS

[76] Inventors: Mark H. Sterner, 5553 Wentworth, Riverside, Calif. 92505; Mark M. Sterner, 1772 Melqua Rd., Roseburg, Oreg. 97470; Ronald S. O. Zane, 5533 Wentworth, Riverside, Calif. 92505

[21] Appl. No.: 169,819

[22] Filed: Mar. 18, 1988

Related U.S. Application Data

[63] Continuation-in-part of Ser. No. 935,265, Nov. 26, 1986, Pat. No. 4,735,816, which is a continuation-in-part of Ser. No. 775,756, Sep. 13, 1985, abandoned.

[51] Int. Cl.$^4$ ............................ A23B 7/02; A23L 1/20
[52] U.S. Cl. ..................................... 426/461; 426/507; 426/510; 426/634
[58] Field of Search ............... 426/457, 460, 461, 634, 426/507, 629, 510

[56] References Cited

U.S. PATENT DOCUMENTS

| | | | |
|---|---|---|---|
| 1,088,741 | 3/1914 | Stephens | 426/634 |
| 1,813,268 | 7/1931 | Bachler | 426/634 |
| 2,279,280 | 4/1942 | Musher | 426/447 |
| 2,343,149 | 2/1944 | Krause, Jr. | 426/473 |
| 2,475,554 | 7/1949 | Moller | 426/459 |
| 2,657,999 | 11/1953 | Rauch | 426/460 |
| 3,290,159 | 12/1966 | Dorsey et al. | 426/460 |
| 4,251,558 | 2/1981 | Kobayashi | 426/473 |
| 4,407,840 | 10/1983 | Lathrop et al. | 426/629 |

FOREIGN PATENT DOCUMENTS 2163938A  3/1986  United Kingdom .

*Primary Examiner*—George Yeung

[57] ABSTRACT

A method of preparing a reconstitutable bean product containing a quantity of whole beans in combination with crushed or mashed beans is disclosed. The inventive method includes the initial steps of inspecting, destoning, cleaning, and washing the supply of whole beans. Subsequently, the whole beans are tempered for a prescribed period and are thereafter divided into two sub-quantities, one sub-quantity destined to be crushed or mashed and the other sub-quantity destined to remain whole. The separate sub-quantities of beans are then hydrated, cooked, dehydrated, combined with secondary ingredients, and packaged to provide an easily reconstitutable refried bean product containing both whole and crushed beans. The sub-quantity of beans destined to be crushed is slightly undercooked, while the sub-quantity of beans destined to remain whole is fully cooked. At the option of the operator, the sub-quantity of beans destined to be crushed may be initially split prior to hydration and cooking.

20 Claims, 1 Drawing Sheet

METHOD FOR PREPARING RECONSTITUTABLE REFRIED BEANS CONTAINING CRUSHED AND WHOLE BEANS

RELATED INVENTIONS

The subject application is a Continuation-In-Part of patent application Ser. No. 935,265, filed on Nov. 26, 1986, entitled DEHYDRATED- REFRIED BEAN PRODUCT AND METHODS OF MANUFACTURE, now U.S. No. 4,735,816, which application is itself a Continuation-In-Part of patent application Ser. No. 775,756, filed on Sept. 13, 1985, and now abandoned, entitled DEHYDRATED BEAN PRODUCT AND METHODS OF MANUFACTURE.

INCORPORATION BY REFERENCE

The entire disclosure of U.S. patent application Ser. No. 935,265, filed on Nov. 26, 1986, is hereby incorporated by reference.

BACKGROUND OF THE INVENTION

The present invention relates generally to the art of food preparation and more particularly to an improved method for preparing a reconstitutable, dehydrated refried bean product containing whole beans as well as crushed beans.

Refried beans are a well known and popular food dish which is common to Mexico and the South-Western United States. The preparation of non-reconstituted refried beans by conventional methodology is generally time consuming and requires high levels of culinary skill. Efforts to minimize the time required in preparing such refried bean dishes, and also efforts to ensure the consistent quality of such preparations, have resulted in the establishment of various methods for pre-preparing refried bean products.

At least one of the prior art pre-preparation methods involves the preparation of a canned refried bean product for subsequent warming prior to consumption. The use of canned products in the food service trade has not, however, been widespread because of the high shipping and warehousing costs associated with canned products, as well as inherent difficulties in using can-type containers.

Other methods of the prior art have provided alternative methods for the preparation of dehydrated reconstitutable refried bean products. Early efforts to prepare such reconstitutable products were fraught with deficiencies and, generally, the early reconstitutable products exhibited undesirable color, taste, and texture qualities. Many of the deficiencies associated with the early methods are overcome by the method described in detail in U.S. patent application Ser. No. 935,265, the disclosure of which is expressly incorporated herein by reference.

While the invention described in U.S. patent application Ser. No. 935,265 does represent a significant advancement over the prior art, it must be recognized that such process is specifically intended for use in the preparation of crushed or mashed beans. More recently it is also desirable to prepare refried bean dishes which include a quantity of whole beans interspersed throughout a matrix of crushed beans. Thus, the present invention provides a method for preparing a reconstitutable refried bean product containing whole beans in combination with crushed or mashed beans.

The present invention has particular utility in the preparation of refried bean dishes and is described herein with particular reference to "beans", however, it must be appreciated that the invention is certainly not limited to beans and may find utility in the preparation of any leguminous comestible or similar food product, such as corn, peas, and the like.

SUMMARY OF THE INVENTION

The present invention comprises an improved method of preparing a reconstitutable refried bean product containing a quantity of cooked whole beans in combination with crushed or mashed beans.

In accordance with the invention there is provided a method for preparing a reconstitutable refried bean product containing a quantity of whole beans interspersed within a matrix of crushed and/or mashed beans. Initially, a supply of whole Pinto or pink beans are inspected, de-stoned, and cleaned. Any substandard or undesirable beans are thereafter discarded. The remaining beans are subsequently subjected to a washing process wherein the beans are thoroughly washed in 50- to 60-degree Fahrenheit water to remove any pesticides or other foreign matter from the beans. Following washing, excess water is drained from the beans and the beans are subsequently "tempered" for a period of at least four hours. The "tempering" process typically comprises the beans being permitted to stand, unagitated, for the prescribed minimum period of four hours. Whole beans which have been washed in 50- to 60-degree Fahrenheit water may, however, undergo tempering for as long as 48 hours prior to use without souring or exhibiting other deliterious effects on flavor.

After the tempering process has been completed, the beans are divided into two separate sub-quantities or streams. A first stream consists of beans which are destined to remain whole while the second stream consists of beans which are destined to be subsequently crushed. The first stream of beans (destined to remain whole) are then subjected to a period of hydration followed by cooking. The moisture content of the first sub-quantity of whole beans at the end of the cooking process must be in the range of 50% to 56%.

The second sub-quantity of beans (destined to be crushed) may be subjected to an optional splitting process prior to conditioning. However, such splitting is not required and the second sub-quantity of beans may be permitted to remain whole through the subsequent hydration and cooking with appropriate adjustments in cooking temperature residence times being made depending upon whether the beans are whole or split.

The moisture content of the second sub-quantity of beans (destined to be crushed) at the end of the cooking process is preferably in the range of 46% to 50%. Following cooking, the second sub-quantity of beans is subjected to crushing. After crushing, the second sub-quantity of crushed beans and the first sub-quantity of previously cooked whole beans may be combined in a manner disposing the crushed beans over top of the whole beans in a layer-like fashion. Thereafter, dehydration of the beans may be accomplished by initially directing heated drying air downwardly on the layered cooked beans at about 1500 cubic ft/min. for about 10 minutes at a temperature of approximately 215 degrees Fahrenheit. Then, the air temperature is reduced to approximately 140 degrees Fahrenheit but the drying air is continued until the moisture content of the whole bean/crushed bean mixture has been reduced to approximately 8%. Finally, the combined, dehydrated beans may be mixed with lard or other secondary ingredients, packaged, and distributed for subsequent use.

The presently preferred whole bean/crushed bean preparation will generally contain about 15% to 40% whole beans. It must be appreciated, however, that the present method for preparing cooked, dehydrated *whole* beans may be employed independently to provide a dehydrated preparation of 100% whole beans without subsequent combination with crushed beans.

DETAILED DESCRIPTION OF THE PREFERRED EMBODIMENT

Figure 1:
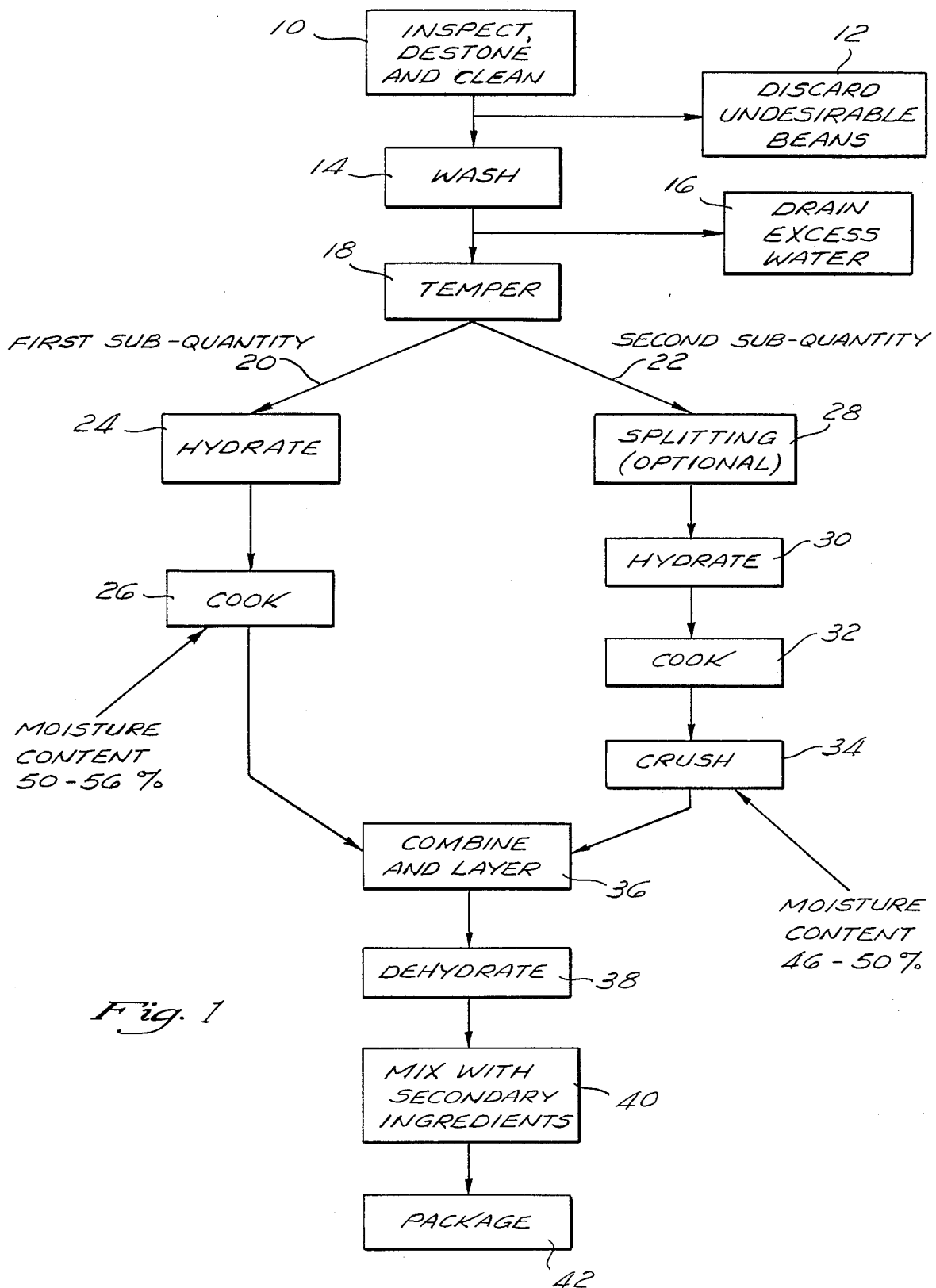
FIG. 1 is a block diagram illustrating a preferred embodiment of the method of the present invention.

Referring now to the drawing wherein the showing is for purposes of illustrating a preferred embodiment of the inventive method, and not for purposes of limiting same, FIG. 1 is a flow diagram outlining a general method for preparing crushed refried beans having a quantity of whole beans contained therein.

INSPECTING, DE-STONING, AND CLEANING

The initial inspection, de-stoning, and cleaning 10 of the beans is carried out manually or automatically in accordance with known methods in the art. Undesirable or substandard beans are discarded 12.

WASHING

Following inspection, de-stoning, and cleaning 10 the beans are washed 14 with water or any other acceptable liquid capable of removing foreign materials such as dirt and pesticide. After washing, the beans are drained 16 and the excess water is discarded.

TEMPERING

After the beans have been washed 14 and drained 16 they are permitted a period of equilibration lasting approximately 4 hours or more. Such period of equilibration is referred to as "tempering" 18. This tempering process 18 assures that the beans will subsequently hydrate evenly, whether they remain whole or become crushed It has been determined that beans washed in 50- to 60-degree Fahrenheit water may be tempered 18 for up to 48 hours prior to cooking without undergoing deliterious flavor changes such as souring.

DIVISION INTO SUB-QUANTITIES OR SEPARATE STREAMS

After tempering 18, the beans are divided into two separate sub-quantities or streams 20 and 22. The first sub-quantity or stream 20 consists of beans which are destined to remain whole. The second sub-quantity or stream 22 consists of beans which are destined to be crushed.

OPERATIONAL SPLITTING BEANS DESTINED TO BE CRUSHED

The second sub-quantity of beans 22 may be split 28 immediately following separation. If such optional splitting 28 is elected, the temperature and/or conditions during subsequent hydration 30 and cooking 32 will, of course, be adjusted accordingly.

HYDRATION

It has been found that moisture content of the beans at the end of the cooking process is one factor which determines how well the beans are cooked. It has been further determined that the maximum desirable amount of water that may be added to beans during cooking is approximately 20 pounds per hundred pounds of raw dry bean weight. Thus, given the limited amount of water that may be added during cooking, the pre-cooking hydration steps 24,30 may be critical in insuring that the beans have taken in their optimal amount of moisture prior to the cooking process, thereby ensuring adequate cooking and desirable consistency of the final product.

The hydration steps 24,30 may simply comprise subjecting the washed and tempered beans to a continuous spray of 120-degree Fahrenheit water for 30 to 60 minutes, depending upon the desired degree of hydration. A few alternative hydration methods have also been used successfully. The first alternate method requires that the initially tempered beans be immersed in water at 90 to 120 degrees Fahrenheit for approximately 30 to 60 minutes. The second alternative hydration method is referred to as a "dip and temper" hydration process. Such dip and temper process comprises cyclic competitive immersion, draining, and tempering of the beans. Three to five cycles of immersion, draining, and tempering are generally sufficient to ensure even hydration during cooking. The period of tempering at the end of the first cycle comprises approximately 4 hours. The subsequent tempering steps are then progressively shortened to approximately 2 hours at the end of the final (generally the 5th) cycle. Such dip and temper method of hydration yields beans which are most evenly hydrated. It should be noted, however, that even though the dip and temper hydration method may be used, such does not obviate the need for the initial tempering period described above. Thus, the cyclic tempering periods associated with this alternative hydration method are carried out in addition to the initial tempering step referred to above.

COOKING

The whole beans and crushed beans are cooked 26,32 in separate vessels, under separately controlled conditions, so as to ensure optimal texture and flavor characteristics of the final product. Such separate cooking 26,32 is generally effectuated live steam under pressure of approximately 15 psig. The separate cooking vessels employed are independently rotatable about their horizontal axes, and generally have a capacity of approximately 14 cubic feet. Larger vessels may, of course, be employed provided that the vessels are designed to accomplish the desired cooking of whole and/or split beans and further provided that the volume of beans contained in each such vessel is not so large as to result in crushing of the beans located near the bottom of the vessel during the final stages of cooking. The cooking vessels employed will preferably be of the type described in U.S. patent application Ser. No. 935,265.

The relative conditions under which the whole beans and crushed beans are cooked will be carefully controlled to ensure desirable consistency and flavor of the end product. The variables which must be controlled during cooking in the live steam environment are (a) moisture content of the bean; (b) temperature; and (c) duration of cooking. A bean is considered to be "fully cooked" if, after dehydration, it has no hard center when rehydrated for 15 minutes in boiling water. However, it is known that beans which are fully cooked prior to drying will take on less moisture upon subsequent rehydration than will beans which have been slightly undercooked prior to drying. Thus, slight undercooking of the second sub-quantity of beans (destined to be crushed) is a viable means of ensuring that such beans will be of optimal consistency for subsequent crushing. Accordingly, by the method of the present invention, the first sub-quantity of beans (destined to remain whole) will be fully cooked while the second sub-quantity of beans (destined to be crushed) will be slightly undercooked.

The moisture content of the first sub-quantity of whole beans (destined to remain whole) is carefully controlled prior to and during cooking 26 to ensure complete cooking of such whole beans. To fully cook the first sub-quantity of whole beans, it is generally necessary to have a final moisture content within the beans of approximately 50% to 56%. Such optimal moisture content at the end of the cooking may be achieved by the addition of water in accordance with either of the following examples:

EXAMPLE 1:

36 lbs. original water content of raw dry beans.
240 lbs. water absorbed during conditioning.
20 lbs. water added to disburse seasonings.
40 lbs. water absorbed as steam condensate.
336 lbs. Total Water
(Total water is 56% of gross batch weight of 608 lbs.)

EXAMPLE 2:

36 lbs. original water content of raw dry beans.
138 lbs. water absorbed during conditioning.
60 lbs. water added to disperse seasonings.
40 lbs. water absorbed as steam condensate.
264 lbs. Total Water
(Total water is approximately 50% of total batch weight of 546 lbs.)

Either of these exemplary methods will give rise to whole beans which have been sufficiently hydrated and "fully cooked".

The second sub-quantity of beans (destined to be crushed) will be slightly undercooked prior to crushing 34. In order to achieve optimal undercooking, the moisture content of the second sub-quantity of beans at the end of cooking 32 and prior to crushing 34 should be approximately 46% to 50%. A typical batch of beans destined to be crushed will contain water in accordance with the following example:

EXAMPLE 3:

36 lbs. original water content of raw dried beans.
138 lbs. water absorbed during conditioning.
49 lbs. water added to disperse seasonings
40 lbs. water absorbed as steam condensate.
263 lbs. Total Water
(Total water is 48% of total batch weight of 548 lbs.)

It should be noted that beans which have been cooked at a very low moisture content in a live steam atmosphere tend to darken and may lack important flavor and texture characteristics after cooking. Thus, close control of the water content during cooking is critical.

The first sub-quantity of beans (destined to remain whole) are cooked 26 in live steam at 15 psig for a period of 60 to 75 minutes. The second sub-quantity of beans (destined to be crushed) are cooked 32 in live steam at 15 psi for approximately 60 minutes. It is also possible to use split beans, rather than whole beans, in the second quantity of beans which are intended to be crushed. If such is the case, a 45 minute cook 32 of the split beans is carried out at approximately 250 degrees Fahrenheit. Furthermore, in processes wherein split beans are employed, it is important to commence cooking 32 of the split beans within 12 hours of washing lest some degradation of the bean occur prior to cooking.

CRUSHING

Further in accordance with the invention the second quantity of whole or split beans is crushed 34 in a manner which intricately fractures the cotyledon of the bean in such a way as to create small voids within the structure of the bean. Such voids are not present in the uncrushed bean. Crushing 34 may be achieved by passing the second sub-quantity of split or whole beans between a pair of rollers having a clearance of approximately .005 to .060 inch therebetween, depending upon the texture desired. In a preferred embodiment of the invention the refried beans are crushed 34 between opposing rollers having approximately .010 inch clearance therebetween, thereby yielding a final dehydrated crushed bean product capable of rehydration in less than 5 minutes when covered with boiling water.

BLENDING AND DEHYDRATION OF WHOLE AND CRUSHED BEANS

The whole and crushed beans may be combined and layered 36 prior to drying or may be dried separately and subsequently combined.

Where separate drying is desired, the first and/or second sub-quantity of beans are dried by a special method which has been devised to prevent problems of "bird mouthing" of the whole beans while at the same time providing a quickly rehydratable crushed and whole bean. 'Bird mouthing' is a phenomenon wherein the whole bean splits along its two halves and opens, taking on the appearance of an open bird's mouth. A prior art drying method, described in U.S. Pat. No. 3,290,159, teaches the drying of whole beans with incremental increases in heat being utilized to avoid the problem of "bird mouthing". However, such prior art method has proven *not* to provide a quickly rehydratable bean as required by the method of the present invention. Instead, it has been determined that incremental *decreases* in drying heat will best achieve the desired result by providing a whole bean product which has not become "bird mouthed", but which is readily rehydratable to provide a soft, palatable rehydrated bean in 15 minutes or less. Thus, the method of the present invention utilizes a step-wise *decrease* in heat and humidity during the drying process as opposed to the incremental increases in heat suggested by U.S. Pat. No. 3,290,159.

In the present invention, the cooked beans are first subjected to high drying heat and high humidity for an initial period. After the initial period, the drying of the beans is completed at lower heat and lower humidity. In a preferred embodiment, such diminution in drying heat is carried out in accordance with Example 4 below:

Example 4
Preferred Conditions For Drying Whole Beans

| | Temperature | Relative Humidity | Air Velocity |
|---|---|---|---|
| 1. Initial Conditions: (first 10 minutes) | 215° F. | 90% | 500–1500 cubic feet/min. |
| 2. Subsequent Drying Conditions (until residual moisture equals approximately 8% of bean weight) | 140–180° F. | 10% | 500–1500 cubic feet/min. |

By the preferred drying method shown in Example 4, the initial 10 minute period of high temperature drying is generally sufficient to reduce the moisture content of the beans to about 25% by weight. Thereafter, less vigorous drying conditions are maintained until the moisture content of the beans is approximately 8% by weight.

Alternatively, the first sub-quantity of whole beans and the second sub-quantity of rushed beans may be dried simultaneously. To effect such combined dehydration the whole and crushed beans must first be combined by layering 36 the crushed beans over top of the whole beans on the surface of a common dryer conveyor. The combined, layered whole and crushed beans may then be dehydrated 38 in accordance with the drying conditions set forth in Example 4 provided that, during the initial stage of the process, the heated drying air is directed downwardly so as to be forced through the upper layer of crushed beans at a velocity of approximately 1500 cubic feet per minute. Such downwardly directed drying air creates a high temperature, high humidity atmosphere within the lower layer wherein the whole beans are located. After the initial period of high temperature drying is complete, the whole and crushed beans may then be commingled during the subsequent, lower temperature drying period.

ADDITION OF SECONDARY INGREDIENTS

In accordance with still further aspects of the present invention, the dried whole bean/crushed bean mixture may be combined with quantities of lard or other ingredients 40, ground if necessary, packaged 42, and distributed for reconstitution prior to human consumption.

TYPICAL BATCH FORMULAS

The principal ingredients of refried bean preparations of the present invention comprise pinto beans and/or pink beans and sodium chloride (NaCl). A small amount of hydrochloric acid is added to the water during the cooking process in order to enhance the flavor and texture of the beans. With respect to the cooking 26 of the first sub-quantity of beans (destined to remain whole) only, a quantity of calcium, preferably in the form of calcium chloride (CaCl), is added to the cooking water to insure that the fully cooked whole bean will remain firm enough to withstand subsequent mechanical distribution and processing without excessive degradation or crushing. No calcium is added to the second sub-quantity of beans which are destined to be crushed, as the effects of such calcium addition would be contrary to, and could possibly interfere with, the subsequent crushing of the beans. Typical batch formulas for whole beans and crushed beans are shown below as Examples 5 and 6, respectively.

EXAMPLE 5

A TYPICAL BATCH FORMULA FOR FIRST SUB-QUANTITY OF BEANS (DESTINED TO REMAIN WHOLE)

300 lbs. Dry Raw Beans (540 lbs. after precooking hydration)
7 lbs. Salt (NaCl)
200 ml 12 N Hydrochloric Acid (HCl)
9 oz. Calcium Chloride (CaCl)
20 lbs. Water ($H_2O$)

EXAMPLE 6

A TYPICAL BATCH FORMULA FOR SECOND SUB-QUANTITY OF BEANS (DESTAINED TO BE CRUSHED)

300 lbs. Dry Raw Beans (440 lbs. after precooking hydration)
7 lbs. Salt (NaCl)
200 ml 12 N Hydrochloric Acid (HCl)
20 lbs. Water ($H_2O$)

AUTOMATION OF THE INVENTION METHOD

Of course the method of the present invention may employ an automated system for preparing a reconstitutable refried bean product containing both whole and crushed beans. Such automated system will function to control; (a) the ratio of whole beans to crushed beans, and (b) the timing of each step of the process. Such automated system may provide for continuous production by utilizing continuous tempering bins, continuous conditioning bins, continuous live steam rotational pressure cookers, etc.

Although the method of the present invention has been described generally in conjunction with the preferred embodiment, it is to be understood that many modifications and variations may be resorted to without departing from the spirit and scope of the invention, as those skilled in the art will readily understand. All such modifications and variations are considered to be within the preview of the invention and within the scope of the appended claims or the equivalents thereof.

What is claimed is:

1. A method of preparing a reconstitutable bean preparation containing both crushed and whole beans, said method comprising the steps of:
   a. exposing a quantity of washed whole beans to air for a time sufficient to temper said quantity of whole beans;
   b. dividing said quantity of whole beans into first and second sub-quantities of beans;
   c. separately hydrating said first and said second sub-quantity of beans;
   d. separately cooking said first and said second sub-quantities of beans;
   e. pressing said second sub-quantity of beans to provide crushed beans;
   f. dehydrating said first sub-quantity of whole beans and said second sub-quantity of crushed beans to a moisture content of approximately 7% to 10%;
   g. combining said first sub-quantity of whole beans with said second sub-quality of crushed beans to form a reconstitutable, dehydrated bean preparation containing both crushed and whole beans.

2. The method of claim 1 including the initial steps of cleaning and de-stoning, the quantity of whole beans prior to exposing the washed whole beans to air.

3. The method of claim 1 wherein the exposing step comprises allowing said quantity of whole beans to stand unagitated for a period of at least 4 hours.

4. The method of claim 1 wherein the step of separately hydrating said first and said second sub-quantities of beans comprises subjecting said beans to continuous sprays of 120-degree Fahrenheit water for 30 to 60 minutes.

5. The method of claim 1 wherein the step of separately hydrating said first and said second sub-quantities of beans comprises immersing said beans in water at 90 to 120 degrees Fahrenheit for 30 to 60 minutes.

6. The method of claim 1 wherein the hydrating step comprises repetitive immersion of said beans in water, followed by draining, and tempering of said beans for a total of at least 4 cycles.

7. The method of claim 6 wherein the tempering period at the end of the first cycle comprises approximately 4 hours with subsequent tempering periods being progressively shortened to approximately 2 hours at the end of the fourth cycle.

8. The method of claim 1 wherein the cooking of said first and second sub-quantities of beans is respectively carried out in first and second rotating pressure vessels.

9. The method of claim 1 wherein the cooking step comprises cooking said first sub-quantity of beans in live steam at 15 psig for 60 to 90 minutes.

10. The method of claim 1 wherein the cooking step comprises cooking said second sub-quantity of beans in live steam at 15 psig for approximately 60 minutes.

11. The method of claim 1 wherein the moisture content of said first sub-quantity of beans at the end of cooking is approximately 50% to 56%.

12. The method of claim 1 wherein the moisture content of said second sub-quantity of beans at the end of cooking is approximately 46% to 50%.

13. The method of claim 1 wherein the step of pressing said second sub-quantity of beans to provide crushed beans comprises pressing said second sub-quantity of beans to a configuration of approximately 0.005 to 0.060 inch.

14. The method of claim 1 wherein the dehydrating step comprises placing the first sub-quantity of whole beans on a surface with the second sub-quantity of crushed beans spread over top thereof and directing a stream of drying air downwardly on said layered crushed and whole beans so as to dehydrate said beans to a residual moisture content of approximately 7% to 10%.

15. The method of claim 1 wherein the dehydrating step comprises drying said first sub-quantity of whole beans and said second sub-quantity of crushed beans separately and subsequently combining said first and second sub-quantities of beans to provide the desired dehydrated product containing both whole and crushed beans.

16. The method of claim 14 wherein the dehydrating step further comprises initially providing a stream of high temperature, high humidity drying air and subsequently lowering the temperature and humidity of said drying air for the remainder of the desired drying period.

17. The method of claim 16 wherein the drying air provided during said initial drying period is approximately 215 degrees Fahrenheit, approximately 90% relative humidity and is provided at a velocity of 500–1500 cubic feet per minute while the drying air provided during the subsequent drying period is at a temperature of approximately 140 to 180 degrees Fahrenheit, approximately 10% relative humidity and is provided at a velocity of approximately 500–1500 cubic feet per minute.

18. The method of claim 1 wherein said beans are selected from the group consisting of Pinto beans and pink beans, and combinations thereof.

19. The method of claim 1 wherein the cooking step of said first sub-quantity of beans further comprises combining the following ingredients in the following approximate amounts:
540 lbs. Hydrated Beans
7 lbs. Sodium Chloride
200 ml. 12 N Hydrochloric Acid
9 oz. Calcium Chloride
20 lbs. Water 20. The method of claim 1 wherein the step of cooking said second sub-quantity of beans comprises combining the following ingredients at the stated proportions:
440 lbs. Hydrated Beans
7 lbs. Sodium Chloride
200 ml. 12 N Hydrochloric Acid
20 lbs. Water

* * * * *